CORE BOX FOR PLASTER OF PARIS MOLDS

Filed Sept. 8, 1950 5 Sheets-Sheet 1

INVENTOR.
JAMES C. HEINTZ
BY
ATTORNEY

CORE BOX FOR PLASTER OF PARIS MOLDS

Filed Sept. 8, 1950

5 Sheets-Sheet 2

INVENTOR.

JAMES C. HEINTZ

Gordon C. Mack

ATTORNEY

May 24, 1955 J. C. HEINTZ 2,708,776

CORE BOX FOR PLASTER OF PARIS MOLDS

Filed Sept. 8, 1950

5 Sheets-Sheet 3

INVENTOR.

JAMES C. HEINTZ

BY

ATTORNEY

INVENTOR.
JAMES C. HEINTZ
BY
Lindo C. Clark
ATTORNEY

May 24, 1955 J. C. HEINTZ 2,708,776

CORE BOX FOR PLASTER OF PARIS MOLDS

Filed Sept. 8, 1950 5 Sheets-Sheet 5

INVENTOR.
JAMES C. HEINTZ
BY
Gordon C. Mack
ATTORNEY 2,708,776

CORE BOX FOR PLASTER OF PARIS MOLDS

James Clyde Heintz, Cleveland, Ohio; The Cleveland Trust Company, executor of the said James Clyde Heintz, deceased, assignor, by mesne assignments, to The James C. Heintz Company Application September 8, 1950, Serial No. 183,810

10 Claims. (Cl. 22—13)

This invention relates to the use of plaster of Paris forms in making metal castings. It relates more particularly to the construction and use of a core box preferred for this purpose, especially in the production of plaster of Paris molds for tire matrices to be cast from aluminum and aluminum alloys. However, the invention is not limited thereto and the core box may be found useful in the production of other molds. Other metals can be cast in the molds, for instance, magnesium, brass and other metals and alloys having a melting point under 1000° C.

Considerable work has been published on the use of plaster of Paris forms in the casting of aluminum, etc. Although sand has been used extensively in the casting of metals, the sand grains are relatively coarse and the castings produced have a relatively rough surface. The plaster of Paris particles are so small that the forms made from plaster of Paris have a perfectly smooth surface and metals cast adjacent to such forms require little or no machining. A very material saving in labor results, particularly where the surface of the casting bears an intricate design.

Although the use of plaster of Paris forms for casting metals has received rather careful study, no more than limited commercial success has resulted. Thin castings can be made but castings which comprise a portion that is at least one-half inch thick are apt to be porous due to the inability to vent the gas which comes off from the molten metal as it fills the mold. I have found that if the mold for the casting is formed only in part of plaster of Paris and the balance is formed of a metal which is of higher melting point than the cast metal and rapidly cools it, castings thicker than one-half inch can be made which are non-porous and in every respect desirable from a commercial standpoint. Plaster of Paris finds its greatest use in the molding of intricate designs, the portion of the mold which is made from plaster of Paris will preferably include all of the surface which bears a design. The portion which is made of metal will bear no design, or if it does bear a design it will be a design which can be readily machined in the metal surface. Thus the invention is particularly adapted to the casting of tire matrices, the walls of the mold cavity which are to form the tread and sidewall of the tire being formed of plaster of Paris, and the outer surfaces of the matrix which are to rest against the shell of the tire mold being formed of metal.

The metal portion of the mold, which will be referred to herein as the "chill element" (or the "chill ring" of a matrix mold) will be made of a metal which has a higher melting point than the metal which is being cast, so that it will not be affected by it. Generally cast iron will be most suitable. The chill element will ordinarily be relatively thin so that it can expand and contract readily and so that it will not store up heat which will prevent its frequent reuse. Thus, a chill element or chill ring which can be reused at intervals of a half hour or an hour will be found more efficient than elements which must stand twenty-four hours or longer after using in order to cool down to a temperature at which they may be reused.

I claim to have made no invention in the plaster of Paris employed. There are a number of plasters on the market designed for the manufacture of molds for casting metals and any of these may be used.

In the manufacture of tire matrices, I prefer to form the intricate tread and sidewall design in the plaster of Paris form with a flexible pad which can be made of rubber or a vinyl composition, or any flexible setting plastic. The material known as Perma-Flex cold molding compound, sold by the Perma-Flex Mold Company of Columbus, Ohio, has proved very satisfactory. The flexible forming pad is formed from any suitable pattern such as a pattern carved from hard plaster, and the plastic is brought into contact with this pattern surface and set in any usual manner, as by being poured into a cavity formed next to the surface just prior to setting. The use of flexible forming pads is not new in the art and the pad may be made in any known or novel manner. Experience has taught that most of the plastics now sold for the production of flexible forming pads shrink on repeated use. This may be due to loss of plasticizer or for some other reason. The core box in which I make my plaster forms is designed with this in mind and I find that I can make upward of a hundred plaster of Paris forms from a single flexible pad, and as the technique is improved, or as better plastics become available for this use, the number of times that the flexible forming pads can be reused will increase.

The core box required for different castings will, of course, be designed to meet the particular requirements of each casting. The core box I prefer to use for a tire matrix has no cope. The tread width of different tires varies. For example, for highway tires the tread width is roughly seventy per cent of the widest cross section of the tire, whereas in the off-the-road tires the tread width may be as much as ninety per cent of the greatest cross section or width. Therefore, the sidewall angle of the matrix will vary. I employ interchangeable sidewall wedges and tread supports in my core box which are of different sizes and shapes so that a single core box may be used for forming plaster of Paris matrices for tires of different designs and different sizes.

The flexible forming pad fits over the sidewall wedge and tread support and its upper edge is preferably hooked onto a lip which projects upward across the entire back of the core box above the top of the sidewall wedge. The pad is preferably relatively thin and of relatively the same thickness throughout so that it does not become distorted when it shrinks. It may be held to the back or sidewall wedge or other part of the core box by vacuum. In the core box for tire matrices I preferably use as a closure a form which extends down into the central part of the upper portion of the core box and produces a void in the thick portion of the plaster of Paris form. I find this advantageous because by avoiding large masses of the plaster I obtain more uniform drying and I desire to make the plaster surface which contacts the molten metal as uniform as possible.

The core box which is preferred for a tire matrix forms only a segment of the matrix and for matrices for smaller tires I prefer a 60-degree segment and a 45-degree segment for larger matrices. The end walls of the core box—that is, the radial walls—are formed with bosses on their inner surfaces. When the plaster of Paris sets these bosses are embedded in the plaster of Paris form, and to remove the form from the core box I merely raise the end plates vertically. The bosses embedded in the plaster of Paris lift the form with the end plates, and generally the flexible forming pad is removed with the form. As soon as the form has been removed from the box the end plates are easily disengaged. The forming pad is easily stripped from the form after removal from the core box and is available to be used again.

After the plaster of Paris form is removed from the core box it is heated to reduce its moisture content. Runners, etc. may then be cut into the plaster of Paris form to provide for flow of the molten metal during the casting operation. In a segment to be used for molding a tire matrix, it is convenient to cut one runner into the top portion of the form from each of the radial walls, with the two runners coming together at about the centerline of the form. In two of the six 60-degree segments used to form a complete mold for a matrix for a smaller tire, a sprue or runner is cut down from the top of the form to the junction of these two runners. It is desirable to pour the metal into a plaster of Paris sprue and conduct it through plaster of Paris runners because the plaster of Paris is a very good insulating material and the metal is not appreciably cooled by contact with the plaster of Paris. A certain amount of moisture may be left in the plaster of Paris to regulate the amount the metal which contacts it is cooled. Rather than to fabricate separate plaster of Paris forms to serve as runners, I find it advantageous to cut the runners through the forms which constitute the surface of the molding cavity because these are less fragile than separate thin-walled runners which might be designed for the purpose and there is less danger of their being damaged during the pouring operation. Likewise, the time and labor required to assemble a mold are thereby minimized. Runner gates leading from these runners are cut into the radial end surfaces of the forms, and in adjacent forms these runner gates are complementary and the metal enters the molding cavity by flowing through the runner gates between adjacent forms. At the inner ends of these runner gates which are located below the bottom surface of the molding cavity are the risers through which the molten metal flows into the molding cavity. The risers are formed of plaster of Paris and are held in place by the chill ring.

The chill ring for molding a tire matrix is of cast iron and forms the outer surfaces of the matrix which contact the shell of the tire mold. This chill ring, or the chill element of other molds, is provided with one or more suitable openings for the placement of plaster of Paris pouring sprues, and in a chill ring for a matrix two sprues are ordinarily employed on opposite sides of the chill ring. Openings for the risers are located in the chill ring for a tire matrix at the intersections of the segmental plaster of Paris forms. The chill ring is heated unevenly, being heated to the highest temperatures at the sprue and at the several risers. The constant heating and cooling of the cast iron at these locations is apt to result in the cracking of the chill ring. Heavy bosses provided with grooves to facilitate the bending of the chill ring as it expands and contracts minimize the danger of cracking.

This specification includes the disclosure of novel means for locating sipes in plaster of Paris forms. This is claimed in my application Serial No. 247,727, filed September 21, 1951 which has matured into U. S. 2,660,767. The use of a sizing form during the cooling of a casting, which is disclosed herein is claimed in my application Serial No. 247,729 filed September 21, 1951 which has matured into U. S. 2,656,593. The casting of a metal in a mold composed partly of a plaster of Paris form and partly of a metal chill element is claimed in my application Serial No. 247,728 filed September 21, 1951 as well as improvements in plaster of Paris forms disclosed herein. The use of a chill element in a mold for casting is claimed in my application Serial No. 260,609 filed December 8, 1951. The method of assembling segmental forms and apparatus used therein are claimed in my application Serial No. 379,949 filed September 14, 1953. A mold for casting with runner gates and sprues and the method of forming them are claimed in my application Serial No. 396,458 filed December 7, 1953.

The invention will be further described in connection with the accompanying drawings in which—

Figure 7:
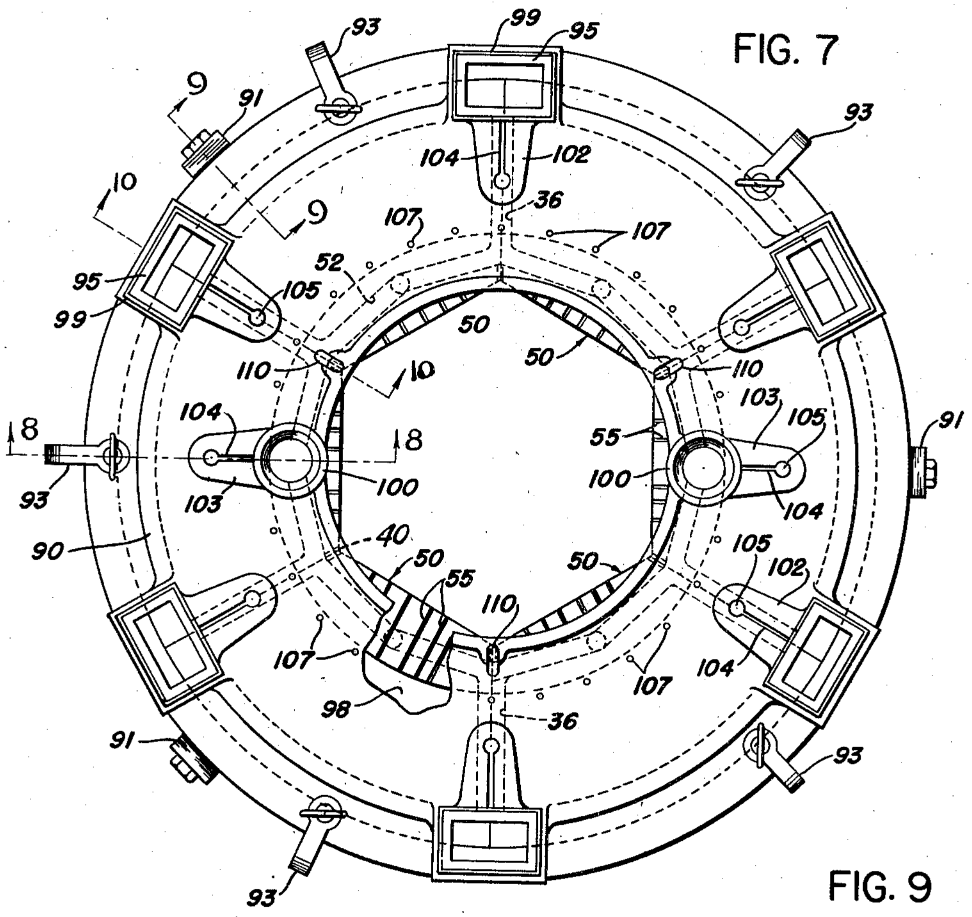
Fig. 7 is a plan view of the chill ring assembled in place over the plaster of Paris molds.
Figure 8:
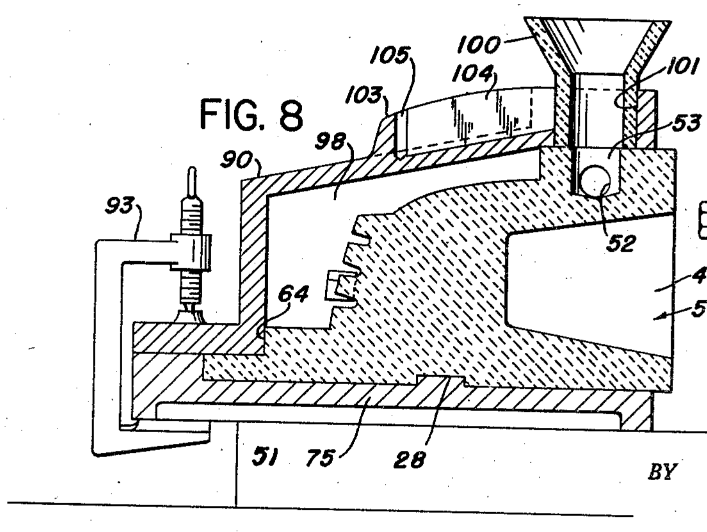
Figure 9:
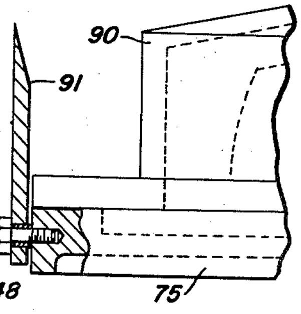
Figure 10:
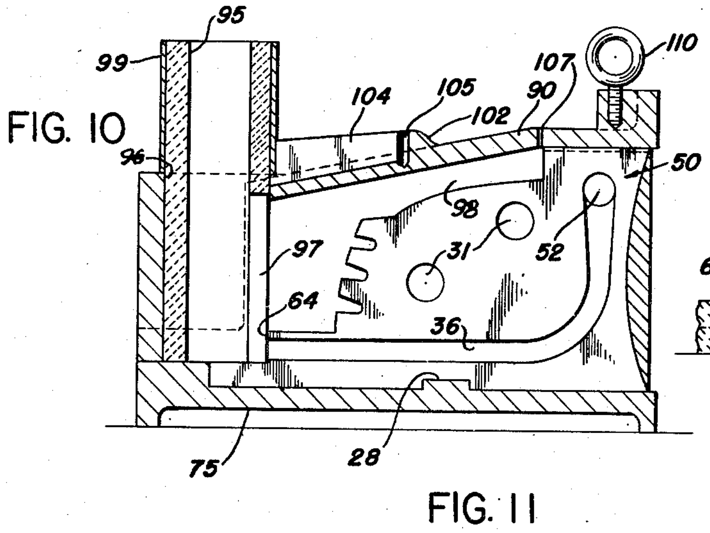
Figure 13:
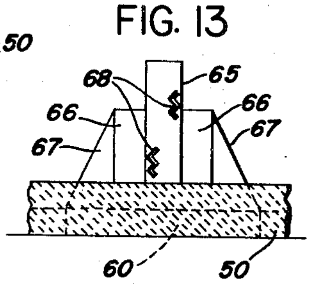
Figure 11:
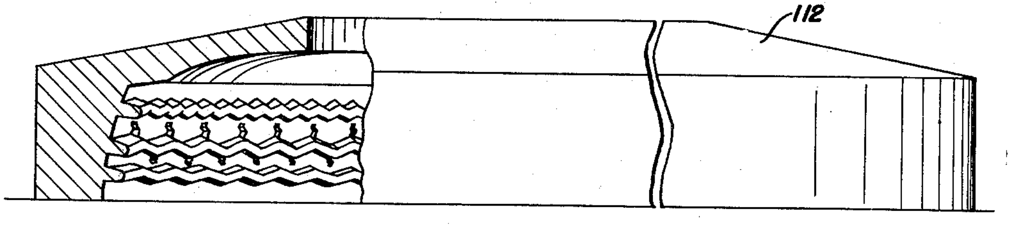
Figure 12:
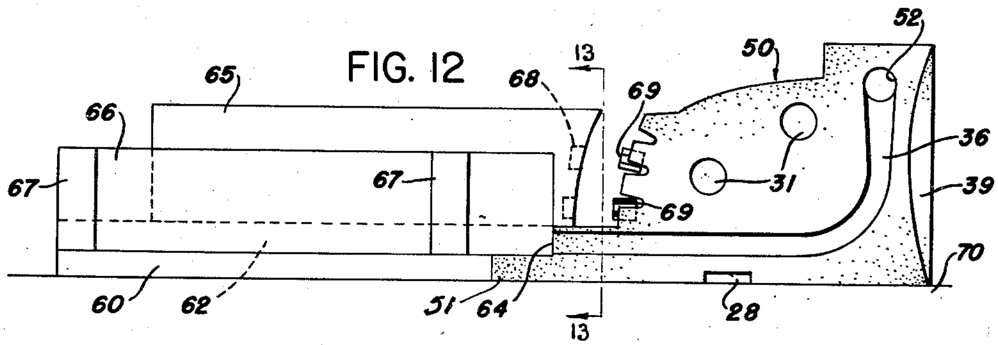

Figs. 8, 9 and 10 are sections on the lines 8—8, 9—9 and 10—10, respectively, of Fig. 7;

Fig. 11 is a side view, partly broken away, of the finished matrix;

Fig. 12 is a side view of the equipment for inserting sipes;

Fig. 13 is a view on the line 13—13 of Fig. 12; and

Figure 14:
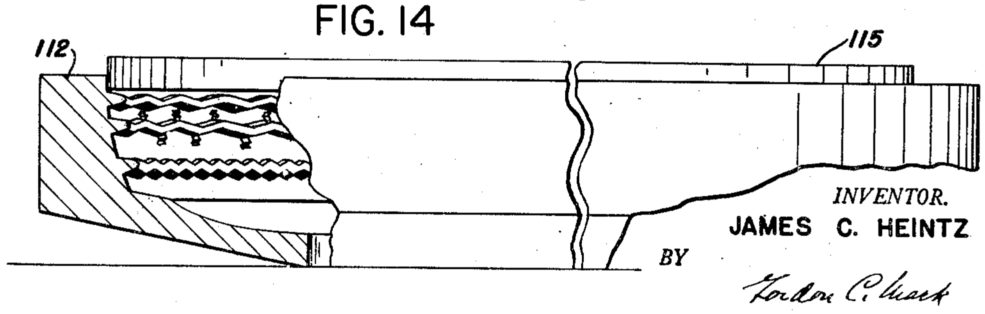

Fig. 14 is an elevation, partly broken away, of the finished matrix, inverted, and with the sizing ring in place.

*The core box*

There is nothing novel about making the flexible forming pad. It is prepared in the usual manner from a master pattern which may be of carved plaster of Paris or any other suitable material.

Figure 3:
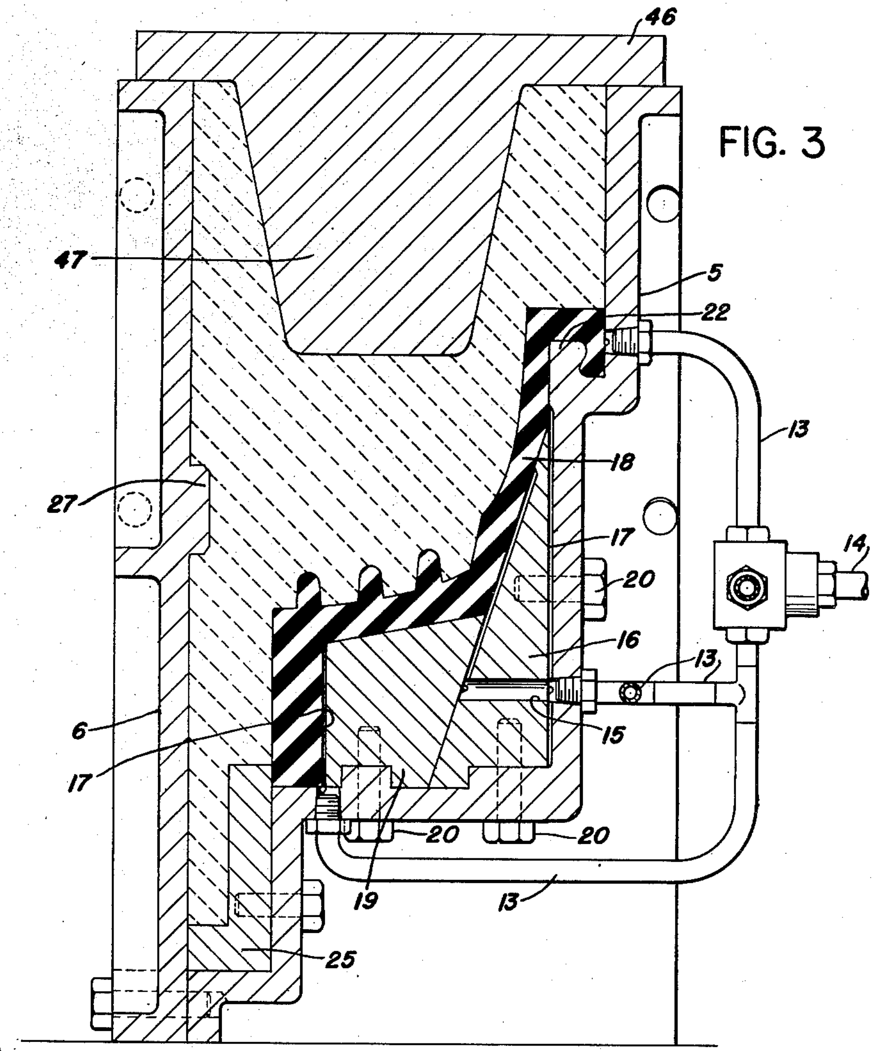
Fig. 3 is a section through the same on the line 3—3 of Fig. 2.
Figure 4:
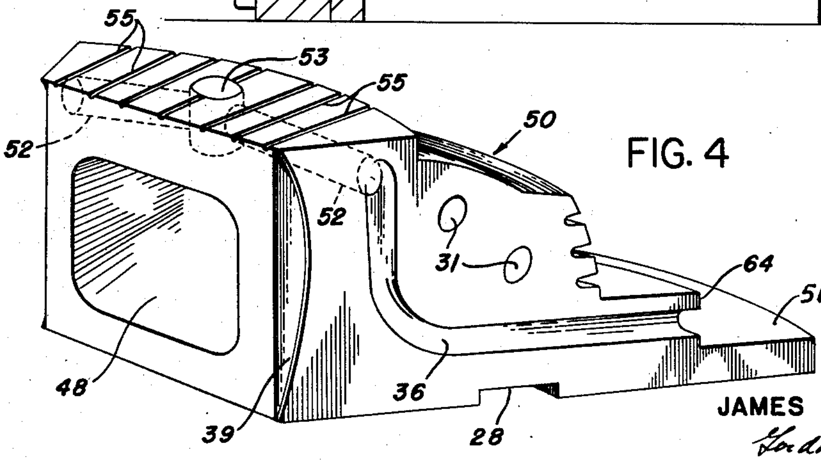
Fig. 4 is a view in perspective of the finished plaster of Paris form.

The core box includes a back member 5 (which is preferably stepped to roughly conform to the shape of the back of the plaster of Paris form), front 6, radial end plates 7 and 8 and cover plates 9 and 10. The end plates converge upwardly and are held by wing nuts 11 to the front 6 and back 5 of the core box. Thus bubbles rising from the material cast in the core box rise vertically in a direction which is generally toward the center of the mold segment. This is particularly advantageous in casting the tread-forming part of a matrix or insert in which the walls of the ribs or the like are generally radial as illustrated in Fig. 3 and other views, because the bubbles rise unobstructed to the surface of the plaster of Paris.

The back member 5 is preferably provided with several connections 13 leading from a vacuum hose 14. Openings 15 from the two middle connections 13 lead through the sidewall wedge 16. In the front of this sidewall wedge and in the backwall 5 are grooves 17 which spread the effect of the vacuum and both hold the sidewall wedge 16 to the backwall 5, and hold the flexible forming pad 18 tight to the sidewall wedge. The bottom connections 13 connect with grooves 17 in the frontwall of tread portion 19 which aid in holding the flexible pad in place. The grooves 17 are all optional, and any or all may be omitted.

Sidewall wedges of different heights and angles may be used in combination with tread portions 19 of different sizes in order to form molding cavities for matrices of different sizes and different designs. The sidewall wedge and tread portion may likewise be held in place by screws 20.

The backplate 5 is formed with the upwardly projecting lip 22 over which the upper end of the forming pad fits. After the pad has been accurately placed, vacuum (if provided) is applied to its back surface to hold it securely until after the molding cavity is filled with plaster of Paris. Different pads will be used with side-wall wedges and tread portions of different sizes and shapes.

The shells of tire molds differ in size. Angular pieces 25 of different length are provided, longer ones being used for tire mold shells of shorter diameter, and shorter ones for tire mold shells of greater diameter.

Thus by proper selection of fillers, a single core box may be used to produce plaster of Paris forms to be used in casting matrices of different designs for tires of different sizes to be used in molds having shells of different diameters.

There is a boss 27 on the front wall 6 of the core box which forms the annular locating groove 28 in the bottom of the plaster of Paris form. This registers with an annular boss on an aligning plate or ring (to be described later) to help in accurate placement of the segments in assembling the mold.

The cover plates 9 and 10 of the core box are each provided with two cylindrical bosses 30. These are embedded in the plaster of Paris, forming indentations 31. After the plaster of Paris form has hardened in the core box the wing nuts 11 are loosened and the cover plates 9 and 10 are raised vertically, lifting the form with them. This is the only purpose of the bosses 30 and indentations 31.

Figure 1:
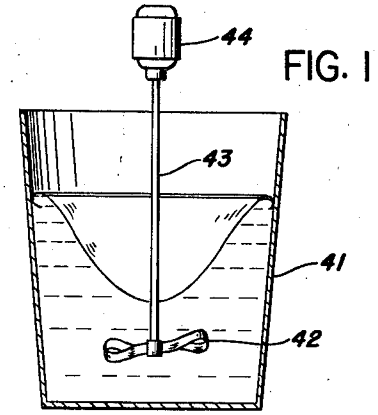
Fig. 1 is a section of a mixing vessel for the plaster of Paris slurry.
Figures 2, 3A:
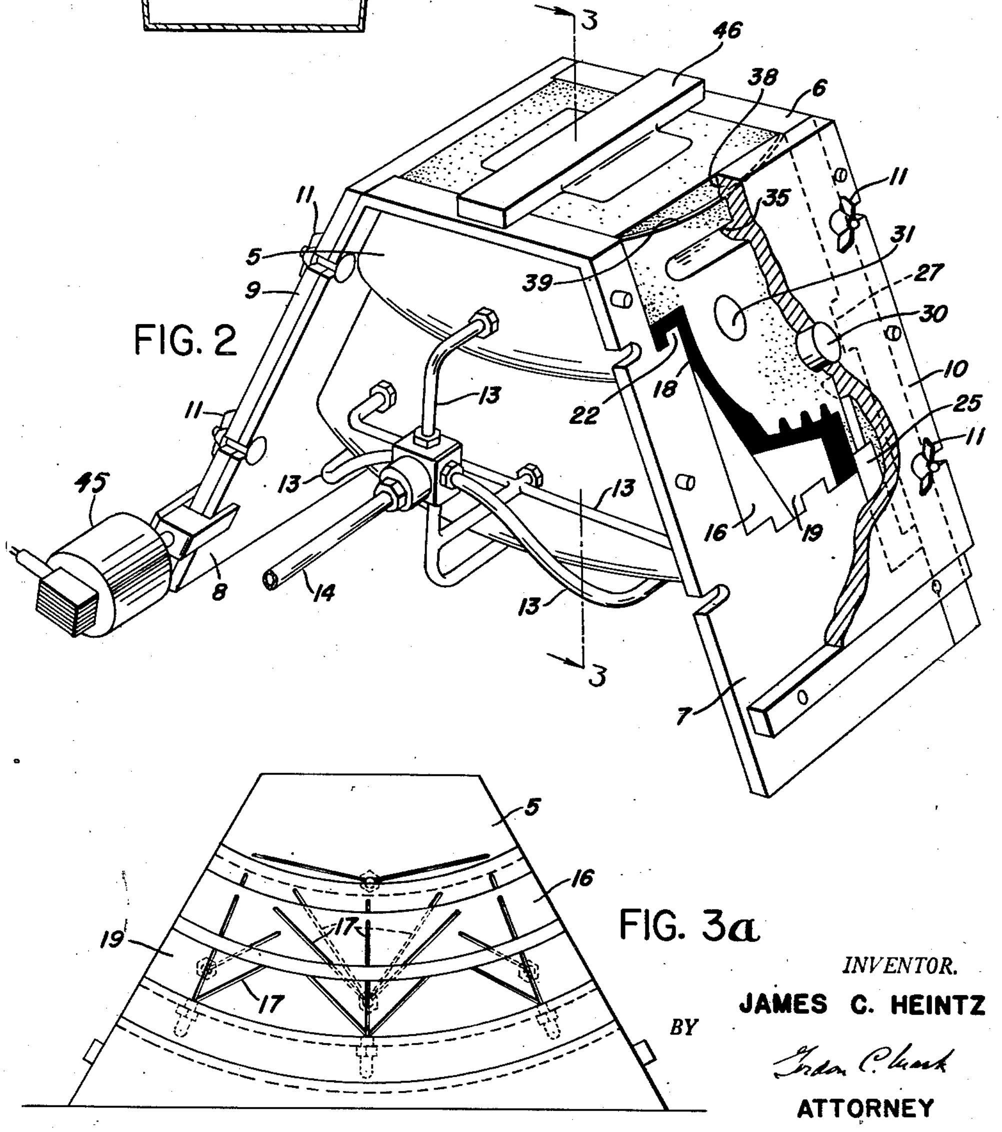
Fig. 2 is a view in perspective of the back of a core box with one end plate partly broken away; with the flexible forming pad in place and the cavity filled with plaster of Paris.
Fig. 3A is an inside elevation of the backplate of the core box with the sidewall wedge and tread portion in place, before positioning the flexible forming pad.

The end surfaces of the plaster of Paris form may be made perfectly flat and then later tooled, or the inner surfaces of the end plates may be formed so as to lessen the required tooling. In Fig. 2 the cover plate 10 is shown provided with the ridge 35 which forms the runner gate 36 through which the hot metal flows into the molding cavity. The top of each end plate is preferably provided with a boss 38 which forms an indentation 39 at the inner edge of each side of the plaster of Paris form. After the forms are assembled side-by-side for the casting of the metal, and clamped between the chill ring and aligning ring (as will be described in what follows), metal clips 40 (Fig. 7) are pressed into the cavities formed by adjacent indentations 39. These help to hold the forms in alignment and chill and set any metal which tends to flow out between adjacent forms.

*Preparing and pouring the plaster of Paris*

There is nothing novel about the plaster of Paris employed for making the forms. Any completely formulated metal-casting plaster prepared from gypsum cement base may be used. The Hydrocal gypsum cement manufactured by the U. S. Gypsum Company is preferred and I preferably use their so-called P-M-C (Permeable Metal Casting) plaster. It produces a gas-permeable form.

For different plaster of Paris forms and when using different plasters, different percentages of water may be desirable. For a tire matrix and for pouring sprues and risers used as more particularly described in connection with the production of a tire matrix, I proceed as follows:

I place 84 ounces of water in a 12-quart pail 41. In this I insert an agitator which is formed of a disc or paddle or the like 42, about 4 inches in diameter, located at the lower end of a shaft 43, driven by an electric motor 44. With the agitator running I introduce 7 pounds of the P-M-C plaster into the water, all at once. I run the agitator in the bottom of the pail for 15 seconds after the plaster has been introduced in order to break up the chunks of powder. I then lift the mixer toward the top of the mass and agitate for another 15 seconds to introduce air into the mixture. I then press the agitator to the bottom of the pail and let it run for one-half minute to remove all air bubbles. The plaster is then immediately transferred to the core boxes which are vibrated by vibrator 45 for 5 seconds. It is usually desirable to give the core box several blows with a hammer or other suitable instrument to release large air bubbles. The plaster of Paris is then allowed to stand until it sets.

Before pouring the plaster of Paris, the flexible pad is brushed with a mixture of lard, wax and kerosene or other solvent (or any other suitable lubricant) to prevent the plaster of Paris from adhering to the pad. Any usual treatment of any inner surface of the core box with lubricant may be employed, according to practices common in the art.

In producing the plaster of Paris form the cavity in the core box is filled with the plaster of Paris and this is covered by the plate 46 to which is attached the core 47 which produces the indentation 48 in the inner surface of each plaster of Paris form. The vibrator 45 is set in motion while the cavity is being filled with the plaster of Paris slurry. This creates a thicker and smoother surface of the plaster of Paris adjacent the pattern face. The finished block is identified herein by the reference numeral 50.

The plaster of Paris form is provided with the lip 51 which projects outwardly from its base. This is clamped between the chill ring and base plate of the final mold, in a manner to be later described. It serves as the bottom of the risers, in a manner also to be described in what follows.

After removing the plaster of Paris form from the core box, runners 52 for the flow of the hot molten metal through the form are hollowed out, and a sprue opening 53 is formed in each third form, by suitable coring devices. The sprue opening is of larger diameter than the runners 52 which are cut into the moist block from both end surfaces. These runners 52 connect with the runner gates 36 and carry the hot molten metal from the sprue opening 53 into the molding cavity during the casting operation.

The plaster of Paris form is then dried by heating in an oven at about 300° F. until only the desired amount of moisture has been removed. It is usual to drive off at least about 40 per cent of the wet weight of the plaster of Paris forms during drying, and the risers and sprues are generally dried more thoroughly than forms which are to line the mold.

After or before drying, it is desirable to draw a file or other marking instrument across the top of the form to make grooves 55 which serve as vents for the escape of gas during the casting of the molten metal.

*Sipes*

If the tire is to be siped the metal sipes are pressed into the plaster of Paris form preferably before drying. They are not pressed flush with the surface of the form but a certain area approaching half the area of each sipe is left exposed. When the metal poured around this exposed portion of the sipe is allowed to cool, the sipe becomes embedded in the metal so that when the plaster of Paris form is destroyed the metal sipes are held by the matrix. The siping equipment and operation are illustrated in Figs. 12 and 13.

The siping equipment includes a base plate 60 which is equal in height to the lip 51 on the plaster of Paris form. Above the baseplate is a plate 62 which projects over the bottom lip 51 of the plaster of Paris form. It rests against the end wall 64 of the form and stands somewhat higher than this wall. The metal plate 65 slides back and forth on the plate 62, between the blocks 66 which are supported by the triangles 67. Openings 68 in the end of the metal plate 65 are the shape of the sipes 69 and are adapted to hold sipes at just the height desired for placement in the plaster of Paris form. The sipes are placed in the openings 68 when the metal plate 65 is pulled away from the plaster of Paris form. The plate 65 is then pushed flush against the plaster of Paris form and the sipes are pressed into the plaster of Paris and held by it so that when the plate 65 is slid back again the sipes remain in the plaster of Paris.

After the completion of one siping operation the siping equipment is slid on the surface 70 to a new position, supplied with fresh sipes, and the siping operation is repeated. Thus the metal plate 65 is operated toward and away from the plaster of Paris form in different radial positions until sipes have been inserted in the desired positions around the entire tread surface of each form. Different metal plates with openings properly spaced are used for matrices with different tread designs.

*Assembling the matrix mold*

It is necessary that the several plaster of Paris forms be correctly positioned in order to have an annular mold cavity. By correctly locating the forms and removing any excess plaster, as may be required, the surface of the tread of the matrix may be made circular with a variation of less than a ten thousandth of an inch. This is accomplished without any machining or other finishing of the matrix. There are no unfinished matrices now on the market which do not vary as much as several thousandths of an inch or more.

Six of the 60° plaster of Paris forms are used to form a single matrix. These are assembled on the core aligning ring 75. The groove 28 in the bottom of each form fits over the annular boss 76 with sufficient play to permit slight movement of each form a few thousandths of an inch toward or away from the center of the ring. The raised outside edge 77 of the aligning ring aids in locating the segments. This raised edge may be continuous, or it may be discontinuous being only where the segments come together. It may be made separate from the ring so that it may be replaced by a segment of larger or smaller diameter for the assembly of larger or smaller forms.

Figures 5, 6:
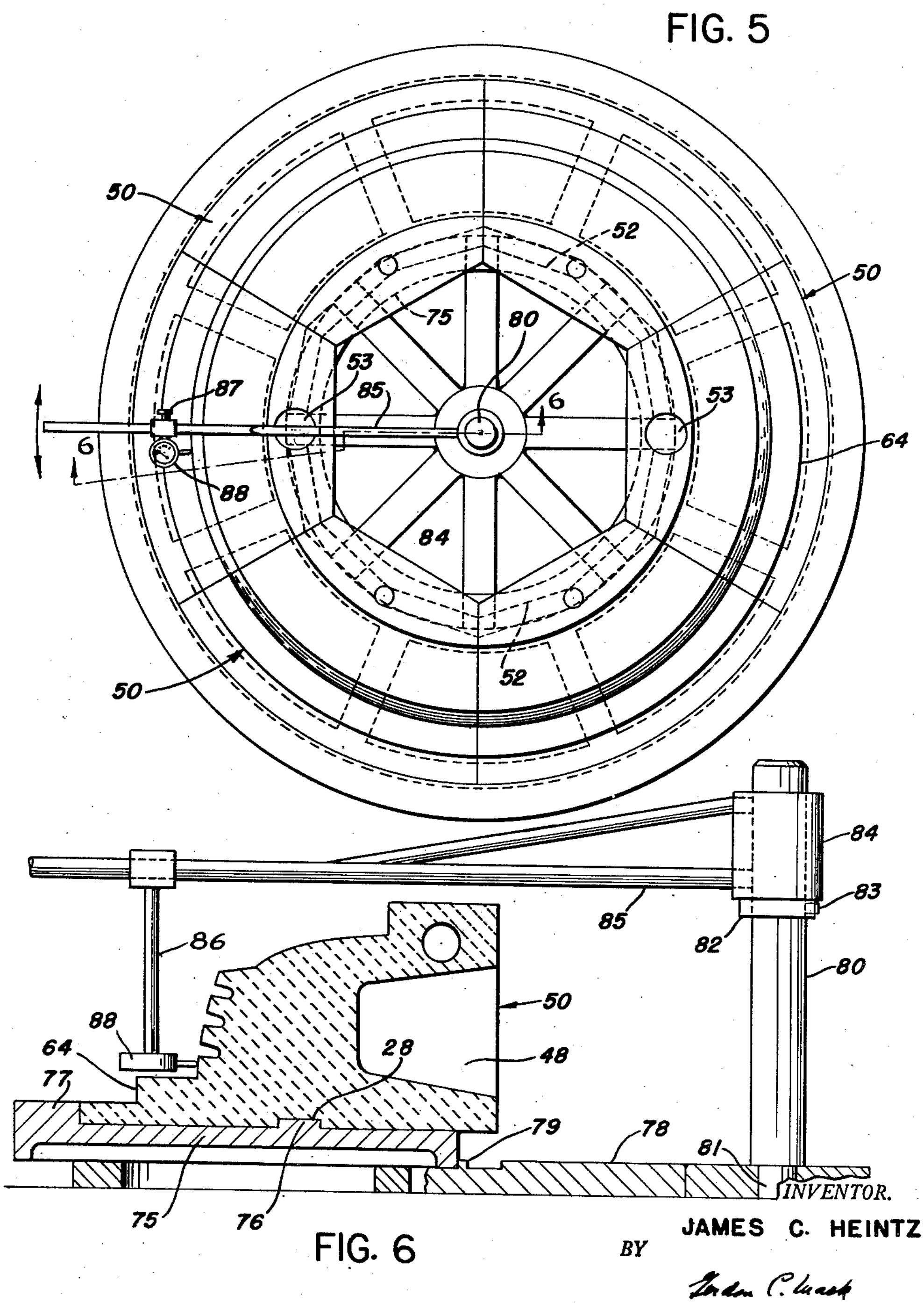
Fig. 5 is a plan view of six of the plaster of Paris forms on the base plate, with the centering gauge in place.
Fig. 6 is a section on the line 6—6 of Fig. 5.

The aligning ring is preferably fixed around the centering gauge, before assembling the gauge. The support 78 of the gauge is provided with an annular boss 79, and the inner surface of the aligning ring is placed adjacent this. The six segments are then put in place, and when they are brought to their approximate final position by calipers or the like, the center pillar 80 is placed in the hole 81 in the support. The collar 82 on the pillar is held in place by the set screw 83. This collar rotatably supports the hub 84 and arm 85. The shaft 86 is slidably mounted on this arm 85 and may be locked in position by the setscrew 87 (Fig. 5). Fastened to one side of the shaft is the pressure gauge 88. Its foot projects inwardly and is lightly spring-pressed against that portion of the tread surface of the plaster of Paris forms which is to form the center portion of the tread of the tire. The arm 85 is slowly turned about the pillar 80 and the reading of the pressure gauge is noted as it contacts the several plaster of Paris forms. Each form is gently tapped in or out, as required, to bring it to the required position. Wherever necessary the blocks may be sand-papered to remove any high spots. As a final step, the gauge 88 may be removed and replaced by a block covered with sandpaper which lightly touches the forms. By swinging the arm 85 through a complete revolution, the center portion of the tread is sanded to a perfect circle.

After the plaster of Paris forms are put in position the chill ring 90 is lowered into place. There are three guides 91 swiveled to the outer edge of the core aligning ring 75 which guide the ring to rest and center it over the plaster of Paris forms. Exact centering is not necessary as the important surface on the matrix is that which is to be formed by the tread portion of the plaster of Paris forms. It is not essential that the cavity for the tire be in the center of the matrix. After the chill ring has been lowered into place it is clamped to the ring 75 by the C-clamps 93. The clamps tighten the chill ring against the raised surface 77, and apply sufficient pressure to the lips 51 of the plaster of Paris forms to hold them in place.

The plaster of Paris risers 95 are then put in place at the ends of the runner gates 36, at the intersection of each two forms. The lower portion of each riser extends down into each of the six openings 96 in the shell. There is an opening 97 in the inner wall of each riser through which the metal flows in entering the molding cavity 98. The risers are protected by a thin metal casing 99.

The plaster of Paris pouring sprues 100 are then put in place in the openings 101, and metal clips 40 are pressed into the cavities 39 between adjacent plaster of Paris forms. These prevent leakage of molten metal from the runner gates 36 into the center of the mold.

Each time the chill ring is used in casting it is heated probably to some 300 or 400° F. and then cooled, and consequently it repeatedly expands and contracts. This is apt to crack the cast iron of which the chill ring is made. Cracks are most apt to occur around the openings into which the plaster of Paris pouring sprues and risers are placed, because these areas are heated to higher temperatures than other parts of the chill ring and are subjected to the greatest expansion and contraction.

To minimize the tendency to crack, relatively large thickened areas 102 and 103, respectively, are provided around the sprues and risers. A groove 104 is provided in each to facilitate the flexing of the chill ring. The inner end of each such groove terminates in a cylindrical enlargement 105 of the groove which provides a positive end to the groove and prevents its elongation as a result of the flexing of the chill ring.

*Casting the aluminum*

Various aluminum alloys are available for casting such objects as tire matrices. An alloy of 95 per cent aluminum and 5 per cent silicon has been used satisfactorily, but others may be used as satisfactorily.

The aluminum is melted and poured at about 1250° F. (its melting point is about 1100° F.). This is a higher temperature than would be permissible if the mold were formed entirely of plaster of Paris. Using molds composed entirely of plaster of Paris the metal cools slowly, and the gas generated forms a porous product. Using a chill element or ring the metal is poured at a higher temperature and cools rapidly, and sets in a non-porous condition.

In casting the tire matrix, molten aluminum is poured simultaneously from two ladles into the two pouring sprues 100. It is poured rapidly and flows from the sprues into the openings 53 which coincide with the bottoms of the sprues. It flows from these openings 53 in both directions through the runners 52. There is an opening 53 in only two of the plaster of Paris forms. In the other forms there is no opening upward from the juncture of the runners 52. The runner gates 36 in the ends of adjacent plaster of Paris forms coincide and as the metal is poured through the sprues 53, some of the metal flows from one runner 52 down through a runner gate 36 and through the riser and the gate 97 into the molding cavity 98, as the balance flows into an adjacent runner 52 to meet the stream poured into the other sprue and flowing through an opposite runner 52 into an intermediate runner gate 36. Thus, by pouring down through the two sprues all of the channels 52 are filled with the molten metal and the runner gates 36 are likewise filled, and the metal flows down through these and through the risers into the molding cavity. In flowing through the small passages the metal loses all or most of its turbulence. The molten metal does not come into contact with any metal until after it passes through the gates 97 so there is little loss in temperature. As it flows out around the riser it makes its first contact with the chill ring. Eventually, as the cavity is filled, the whole under surface of the chill ring is contacted by the molten metal and heated by it. The metal rapidly dissipates the heat and chills the metal.

Thus the cavity 98 fills with the hot molten aluminum. The chill ring chills the aluminum and it sets first around the outer edge of the matrix, and as the setting progresses inwardly the gases in the metal are forced out through the grooves 55 and openings 107 in the cover portion of the chill ring, and through the forms 50 themselves, forming a dense, nonporous casting. The moisture left in the plaster of Paris hastens the cooling of the metal, but steam which is generated from this moisture is removed from the metal with the gases, as the metal sets. The fact that the plaster of Paris is a good insulator and prevents the metal adjacent it from setting until the opposite surface of the casting adjacent the chill ring has cooled and set, permits the expulsion of the gases from the metal as it sets, and this is a very important feature of the invention.

The last metal to set is that in the risers. Before lifting the chill ring from the matrix, and as soon as the metal in the risers has set, the sprues and risers and the metal they contain are severed from the top of the chill ring. This is easily done by scraping a shovel or other sharp implement across the chill-ring openings.

The chill ring is relatively expensive and it is desirable to reuse it several times each day. Therefore, after the aluminum has set, the chill ring is lifted from the cast matrix, and after standing a sufficient time to cool it is reused. Screw eyes 110 are provided to lift the chill ring from the matrix.

The plaster of Paris forms are then broken away from the matrix and with the use of an air hose all plaster of Paris adhering to the matrix is removed, such as that which may adhere to the sides or in the grooves in the tread. This is done before the contraction which accompanies cooling has been completed. To limit such contraction and to true up the matrix a cast iron ring 115 or other circular object is inserted in the edge of the matrix, as illustrated in Fig. 14. The matrix contracts against this ring and as the circumference of the ring has been machined to a true circle, the matrix after cooling is exactly round. The sizing ring 115 can be removed by a mallet, or sledge, or other implement, or in any convenient manner. For cast objects which have no such round opening, other sizing forms of an appropriate shape are employed and the cast object is allowed to cool around them. After cooling, i. e. on completion of the contraction, the sizing forms are removed in any suitable way. The use of the sizing form prevents distortion of the cast object on cooling. It has not been customary to remove articles cast from aluminum, etc. from the mold until after they have cooled and there is no danger of subsequent contraction. The presence of the mold during cooling prevents or may limit contraction which would otherwise occur. Although the invention relates more particularly to the use of a sizing form in objects cast in a mold formed partly of plaster of Paris and partly of a metal chill element, the invention includes the use of the sizing forms with freshly formed cast objects which are still shrinkable regardless of the type of mold in which they have been formed.

Certain metals, for example aluminum, are known to "grow" when repeatedly heated and cooled. For instance, the dimensions of a cast aluminum matrix will change through growth due to its being repeatedly heated to vulcanization temperature and then cooled. To prevent or limit such growth the matrix is heated to about 500° F. for six or eight hours, to prepare it for use.

An advantage in the use of plaster of Paris forms in casting metals, is that the castings produced in contact with them are substantially perfect in every detail and need little or no trimming or other machining. Any machining that is required may be done before or after the matrices are heated to prevent growth.

Although the invention has been described more particularly in connection with the production of tire matrices, especially from aluminum alloys, it is to be understood that it relates to the production of other objects and in general the chill ring, or chill element employed will be made of cast iron or other ferrous metal, and the metals which are to be cast will be metals with a melting point not over 1000° C.

What I claim is:

1. A core box for a segmental plaster of Paris form for the tread-forming part of a tire mold, which core box is to be used with a flexible pad and includes a removable segmental wedge-shaped tire sidewall member positioned against an inner wall of the core box and with the radial edges of said wedge-shaped member pointing upwardly and making equal angles with a horizontal plane, and a removable segmental tread support adjacent to said wedge-shaped member with its top intermediate the top and bottom of the wedge-shaped member and with its radial edges in the same planes as the radial edges of the wedge-shaped member, and means on said inner wall of the core box above said wedge-shaped member for supporting the flexible pad over at least a portion of the exposed surfaces of the wedge-shaped member and tread support, whereby any of the aforesaid removable members may be replaced by a like member of different pattern.

2. A core box having therein a segmental cavity bounded by a back, a bottom, removable upwardly converging sides and a removable front, which cavity is designed for the molding of a tread-forming part of a tire mold which includes irregularities in the tread thereof, said irregularities being located in the bottom of the cavity, which core box includes an upwardly projecting lip extending forwardly from the back thereof, a flexible forming pad the top of the back of which has a surface complementary to the top and back of said lip, and removable means adjacent the back of the core box which supports the forming pad away from the vertical, the top of the forming pad being supported over said lip and conforming to the shape thereof, whereby bubbles rising from material cast in the core box rise vertically in a direction which is generally toward the center of the segment.

3. A core box having therein a segmental cavity bounded by a back, a bottom, removable upwardly converging sides and a removable front, which cavity is designed for the molding of a tread-forming part of a tire mold which includes radial irregularities in the tread thereof, which cavity has a flexible forming pad therein, removable means adjacent the back of the core box for supporting the pad away from the vertical, the back of the core box and the top of the pad comprising complementary anchoring means for the pad whereby the top of the pad is supported and bubbles rising from the material cast in the core box rise vertically in a direction which is generally toward the center of the segment.

4. A core box which includes a back, an upwardly projecting lip extending forwardly from the back from one edge thereof to the other, side walls extending forward from the back, each side wall including an upwardly projecting lip identical in outline with the aforesaid lip and including at its lower end supporting means for the core box, said latter lips fitting adjacent the ends of the lip on the back, and additional sidewalls removably fastened over the aforesaid side walls and fitting flat against the sides of the lips on the aforesaid side walls.

5. A core box which includes a segmental back which is stepped down forwardly, a lip extending upwardly from the top step, a removable wedge-shaped member removably fastened at the rear of the second step and a removable second member removably fastened immediately in front of this, the top of the second member being lower than the top of the wedge-shaped member, a flexible forming pad with its top located over the lip, the back of the pad fitting against the exposed portion of the wedge-shaped member and extending over the top of the second member and against its front surface, a third step and a removable angular member fitting against the bottom and back of this third step and extending up in front of the bottom of the pad.

6. A core box for a segmental plaster of Paris form for the tread-forming part of a tire mold, which core box includes an upright flexible forming pad which includes a portion to conform to the sidewall of a tire and another portion to conform to a portion of the tread of a tire, a separate support for each portion, a vacuum conduit between the two and in the face of the support for the latter portion, a vacuum conduit which extends through the back of the core box and connects with the aforesaid vacuum conduit, a vacuum pump, and means connecting the vacuum conduits therewith.

7. A core box for a segmental plaster of Paris form for the tread-forming part of a tire mold designed for use with a flexible forming pad one portion of which conforms to the sidewall of a tire and another portion which conforms to a portion of the tread of the tire, which core box includes a support with a relatively vertical supporting surface for the first portion removably fastened in the core box and a support with a relatively horizontal supporting surface for the second portion removably fastened in the core box immediately in front of the first member, and an angular member removably fastened in the core box in front of the second member with the angular portion extending forward from the bottom thereof and with the top of the angular member located above the bottom of the second member.

8. A core box with a molding cavity therein designed for the production therein of a plaster of Paris form to be used adjacent another plaster of Paris form to produce a cavity in which molten metal is to be cast, which core box includes a back, two sides extending forwardly therefrom and an elongated boss projecting into the molding cavity from at least one of the sides, which boss forms a depression in the plaster of Paris form made in the core box and serves as a runner for the conduct of molten metal therethrough when the form is used adjacent another plaster of Paris form to produce a cavity for the casting of molten metal.

9. A core box containing a segmental molding cavity in which to produce a plaster of Paris form for the tread-forming part of a tire mold, which core box includes a back, two sidewalls which diverge radially downward to form the sides of the cavity and are removably fastened to the back, a flexible forming pad extending forwardly and downwardly from the back and including a portion conforming to the side wall of a tire and another portion conforming to a part of the tread of a tire, said pad defining part of the cavity, a front which is removably fastened to the side walls and defines a part of the cavity, and projecting inwardly and symmetrically into the cavity from each side wall an elongated boss extending from a position near the top and rear thereof, without going upwardly, to a position to the front and downwardly therefrom, whereby the cavity is capable of producing a segmental plaster of Paris form which located adjacent an identical segmental plaster of Paris form provides therebetween an elongated runner for the conduct of molten metal between them.

10. A core box for a plaster of Paris form for molding the tread-forming part of a tire, which core box provides a segmental cavity with a back, bottom, removable upwardly converging sides, and a removable front, a flexible forming pad in the cavity, means on the inner face of the back of the cavity which holds the top of the forming pad, and below said means removable supporting means for the forming pad the upper portion of which slopes forwardly to a portion which extends abruptly forwardly and then downwardly, the forming pad being supported on said supporting means with its bottom portion held between said downwardly extending portion of the removable supporting means and the removable front of the cavity.

References Cited in the file of this patent

UNITED STATES PATENTS

| | | |
|---|---|---|
| 860,989 | Norton | July 23, 1907 |
| 1,634,106 | Hopkinson | June 28, 1927 |
| 1,745,408 | Creque | Feb. 4, 1930 |
| 1,778,500 | Kuhlke | Oct. 14, 1930 |
| 1,806,000 | Scott | May 19, 1931 |
| 1,852,635 | Althaus | Apr. 5, 1932 |
| 2,049,057 | Geldhof et al. | July 28, 1936 |
| 2,120,700 | Gay | June 14, 1938 |
| 2,151,841 | Dorris | Mar. 28, 1939 |
| 2,198,498 | Hagemeyer | Apr. 23, 1940 |
| 2,220,703 | Bean | Nov. 5, 1940 |
| 2,248,693 | Bartscherer | July 8, 1941 |
| 2,263,001 | Gunsaulus et al. | Nov. 18, 1941 |
| 2,284,729 | Dusevoir | June 2, 1942 |
| 2,299,016 | Hagemeyer | Oct. 13, 1942 |
| 2,368,719 | Miller | Feb. 6, 1945 |
| 2,434,780 | Wiss et al. | Jan. 20, 1948 |
| 2,452,855 | Kempf | Nov. 2, 1948 |
| 2,476,726 | Haas | July 19, 1949 |
| 2,524,737 | Sawyer | Oct. 3, 1950 |
| 2,560,052 | Miller et al. | July 10, 1951 |
| 2,606,348 | Ronceray | Aug. 12, 1952 |
| 2,608,529 | Varian | Aug. 26, 1952 |